United States Patent
DiLorenzo

(10) Patent No.: US 8,014,717 B2
(45) Date of Patent: Sep. 6, 2011

(54) MEDIA CONTENT DISTRIBUTION SYSTEM AND METHOD

(75) Inventor: Mark DiLorenzo, Laguna Beach, CA (US)

(73) Assignee: Hotel Digital Network Inc., Laguna Hills, CA (US)

( * ) Notice: Subject to any disclaimer, the term of this patent is extended or adjusted under 35 U.S.C. 154(b) by 1094 days.

(21) Appl. No.: 11/454,668

(22) Filed: Jun. 16, 2006

(65) Prior Publication Data

US 2006/0288395 A1 Dec. 21, 2006

Related U.S. Application Data

(60) Provisional application No. 60/692,698, filed on Jun. 20, 2005.

(51) Int. Cl.
*H04H 40/00* (2008.01)
(52) U.S. Cl. ............................. 455/3.06; 455/3.01
(58) Field of Classification Search ........ 455/3.01–3.06; 725/63–64, 74–82, 105, 135
See application file for complete search history.

(56) References Cited

U.S. PATENT DOCUMENTS

| | | | |
|---|---|---|---|
| 5,761,601 A * | 6/1998 | Nemirofsky et al. ........... 725/34 |
| 6,256,554 B1 | 7/2001 | DiLorenzo ................... 700/236 |
| 6,347,216 B1 | 2/2002 | Marko et al. ................. 455/12.1 |
| 6,438,450 B1 | 8/2002 | DiLorenzo ................... 700/236 |
| 6,477,707 B1 * | 11/2002 | King et al. ...................... 725/97 |
| 6,510,317 B1 | 1/2003 | Marko et al. .................. 455/428 |
| 6,549,774 B1 | 4/2003 | Titlebaum et al. ............ 455/427 |
| 6,553,077 B2 | 4/2003 | Rindsberg et al. ............ 375/260 |
| 6,564,003 B2 | 5/2003 | Marko et al. ..................... 386/69 |
| 6,594,682 B2 * | 7/2003 | Peterson et al. .............. 718/102 |
| 6,622,171 B2 * | 9/2003 | Gupta et al. .................. 709/231 |
| 6,650,963 B2 | 11/2003 | DiLorenzo .................... 700/234 |
| 6,724,827 B1 | 4/2004 | Patsiokas et al. ............. 375/259 |
| 6,961,858 B2 * | 11/2005 | Fransdonk ...................... 726/29 |
| 7,082,142 B1 * | 7/2006 | Begeja .......................... 370/507 |
| 2002/0198963 A1 * | 12/2002 | Wu et al. ....................... 709/219 |
| 2005/0015812 A1 * | 1/2005 | Banet et al. ................... 725/126 |
| 2005/0183120 A1 * | 8/2005 | Jain et al. ........................ 725/46 |
| 2005/0239399 A1 * | 10/2005 | Karabinis ..................... 455/3.02 |
| 2007/0168523 A1 * | 7/2007 | Jiang et al. .................... 709/228 |

OTHER PUBLICATIONS

Jonas, Karl et al., Audio Streaming on the Internet—Experiences With Real-Time Streaming of Audio Streams, IEEE Catalog No. 97TH8280, ISIE 1997, Portugal, pp. SS71-SS76.

* cited by examiner

*Primary Examiner* — Raymond Dean
(74) *Attorney, Agent, or Firm* — Koppel, Patrick, Heybl & Philpott

(57) ABSTRACT

A method of distributing content from multiple media content providers comprises combining the content into one or more composite data streams, and conveying the composite data streams to a plurality of receiver systems, each of which has a user interface that displays content provider information and allows for the selection of one of the providers for playing of the selected provider's media content. The media content is preferably provided to a computer server system via a data communications network. One or more composite data streams can be upconverted and uplinked to a satellite system for reception by satellite radio receivers. Intermediary service providers might also be used to receive the composite data streams, either via satellite or land-based communications lines, and format the data as needed for use by one or more associated end-user devices.

3 Claims, 12 Drawing Sheets

MEDIA CONTENT DISTRIBUTION SYSTEM AND METHOD

RELATED APPLICATIONS

This application claims the benefit of provisional patent application No. 60/692,698 to DiLorenzo, filed Jun. 20, 2005.

BACKGROUND OF THE INVENTION

1. Field of the Invention

The invention relates generally to media distribution systems and more particularly, to systems and methods for receiving and re-distributing media content provided by multiple sources, such as broadcast, internet, satellite, cable, etc.

2. Description of Related Art

Media content, such as entertainment programming, music, news, etc., is distributed by an ever-increasing number of sources. For example, programming can be distributed by conventional over-the-air broadcast means, by cable, by a satellite TV or radio provider, or via the Internet.

Unfortunately, the ability to receive content from all of these sources requires a wide variety of equipment, such as a satellite dish and set-top box, a computer with high-speed Internet access, a satellite radio receiver, etc. This equipment can be expensive, as well as complicated to set up and operate. Furthermore, with the exception of conventional over-the-air broadcasters, virtually all media providers require the user to subscribe to their service, and pay a corresponding monthly fee.

While existing satellite radio, satellite TV, cable TV and broadcast TV content providers offer a large number of channels with diverse programming content, there is a need to simplify the means by which a user receives media content from multiple providers.

SUMMARY OF THE INVENTION

Briefly, and in general terms, the invention is directed to a system and method of distributing content from multiple media content providers.

The present method comprises providing an interface which receives media content from a plurality of media content providers, including, for example, AM, FM and/or satellite radio content, as well as media content streamed over the Internet. The interface, suitably a computer server system, combines the various content into one or more composite data streams. The invention provides a means of conveying the composite data streams to a plurality of receiver systems, each of which has a user interface that displays content provider information and allows for the selection of one of the content providers for playing of the selected provider's media content.

The media content is preferably provided to the computer server system via a data communications network such as the Internet, with content converted into a digital data streaming format where necessary. One possible means of conveying the composite data streams to the receiver systems comprises upconverting at least one of the composite data streams and uplinking the upconverted data to a satellite system; receiving data from the satellite system requires that the receiver systems be a satellite radio receiver. Intermediary service providers might also be used to receive the composite data streams, either via satellite or land-based communications lines, and then format the data as needed for use by one or more associated end-user devices coupled to the intermediary service provider.

These and other aspects and advantages of the invention will become apparent from the following detailed description and the accompanying drawings which illustrate by way of example the features of the invention.

DETAILED DESCRIPTION OF THE PREFERRED EMBODIMENTS

Figure 1:
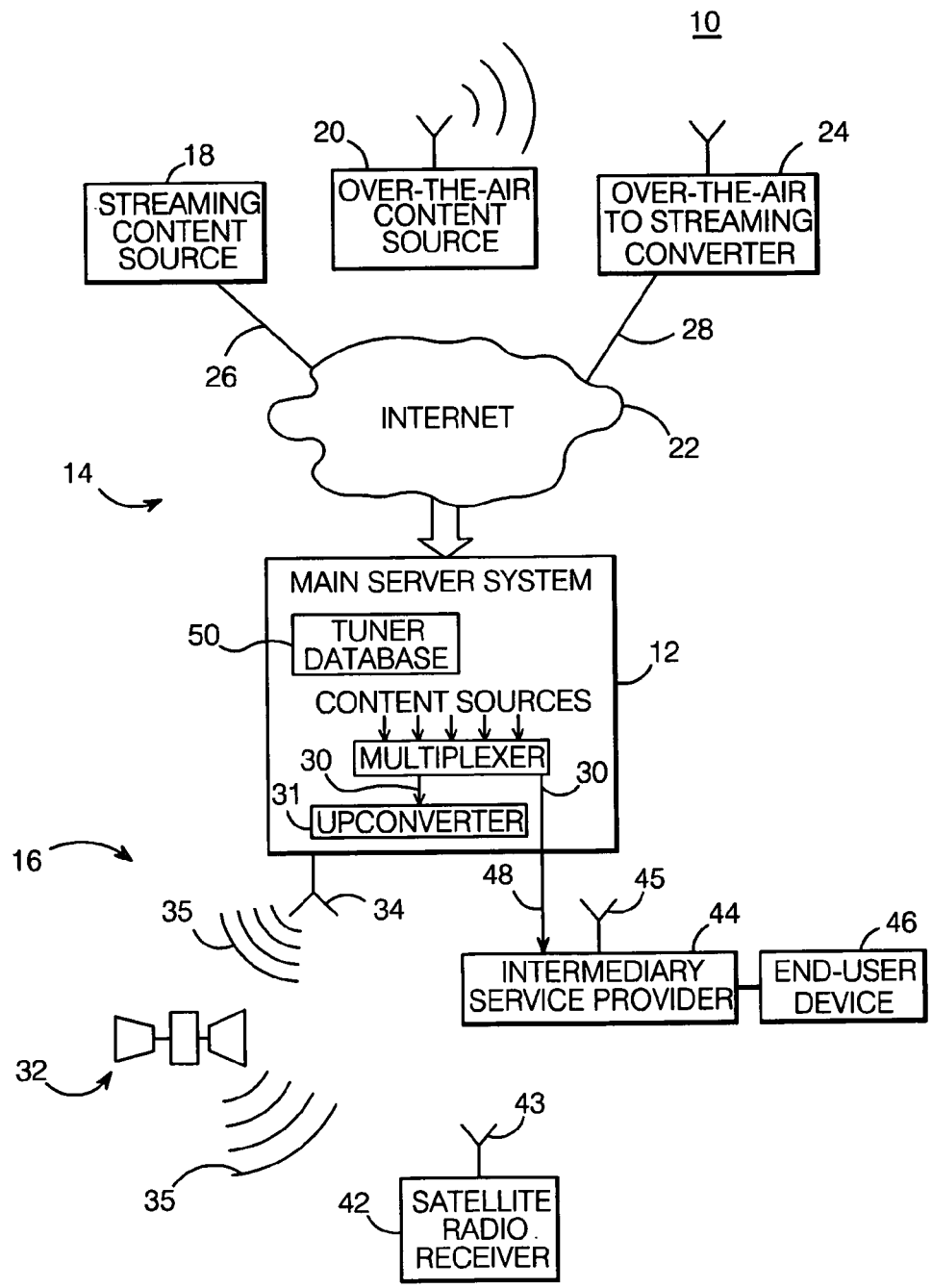
FIG. 1 is a block diagram of a media content distribution system configured in accordance with the invention.
Figure 2A:
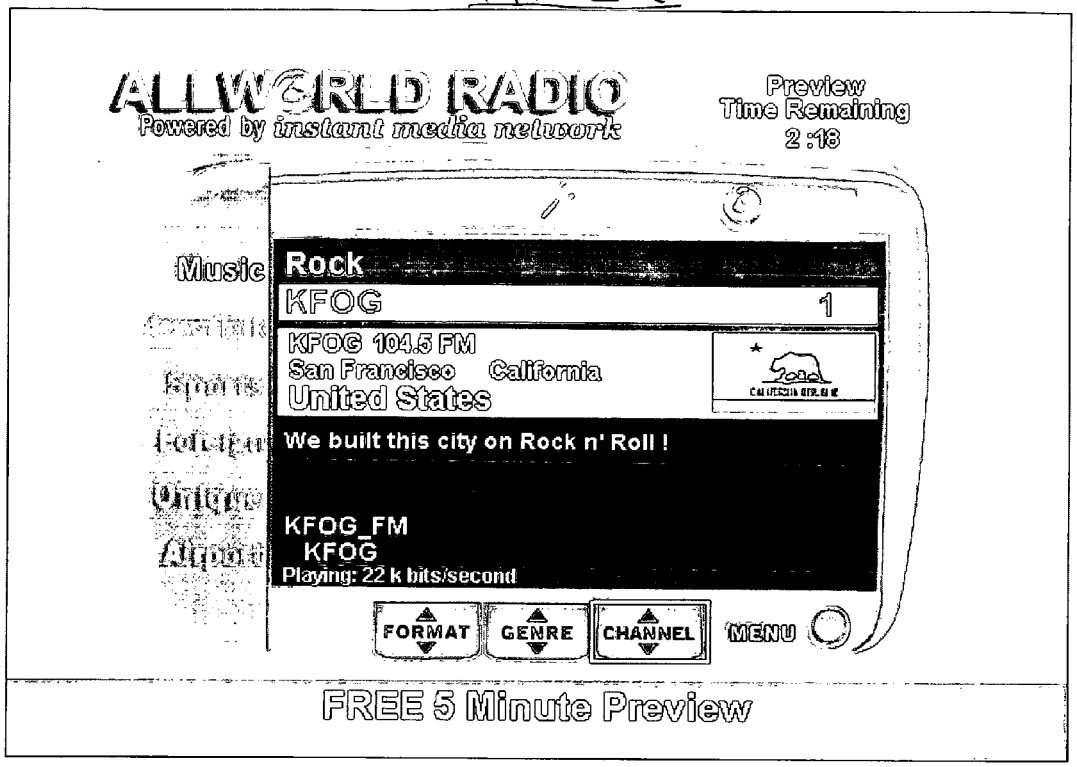
FIGS. 2a-2j are simplified examples of graphical user interfaces that might be displayed on a receiver system configured in accordance with the invention for various sources of media content.
Figure 2B:
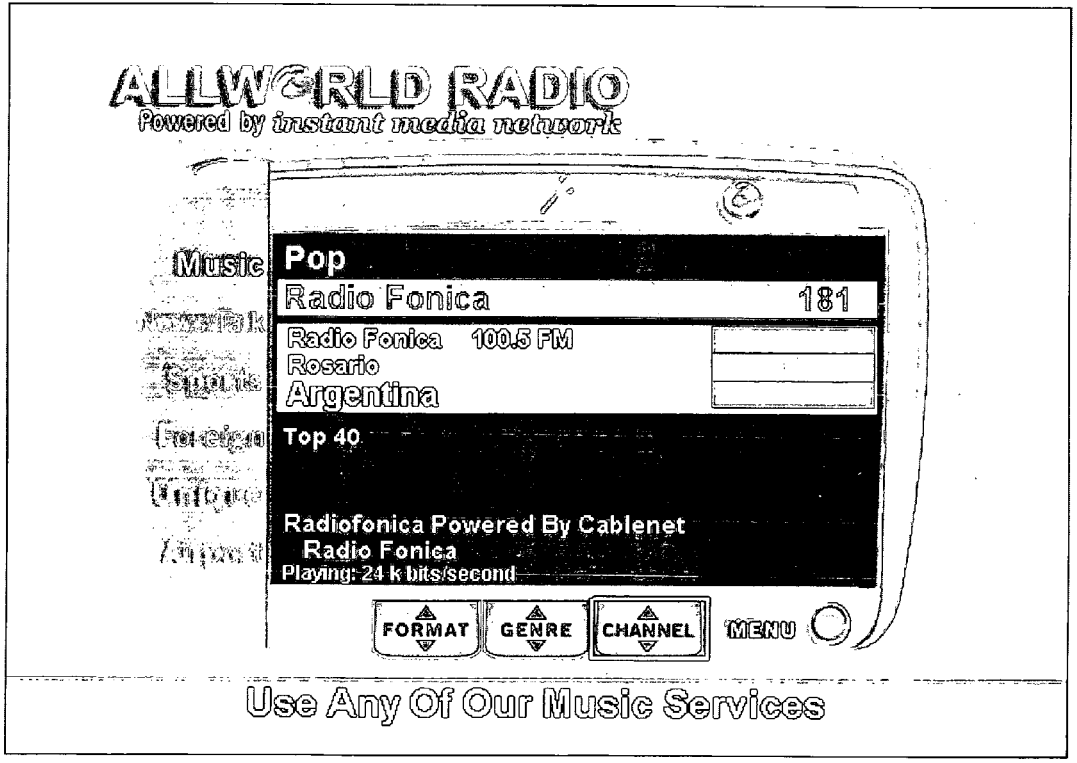
Figure 2C:
Figure 2D:
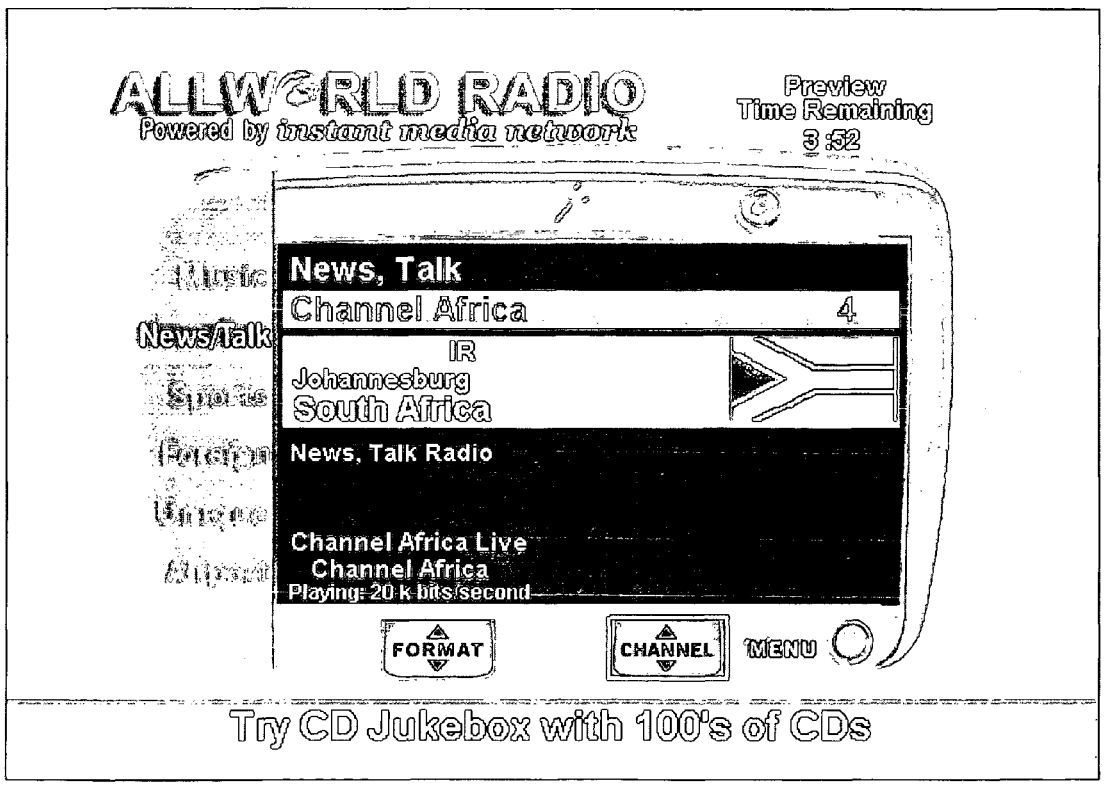
Figure 2E:
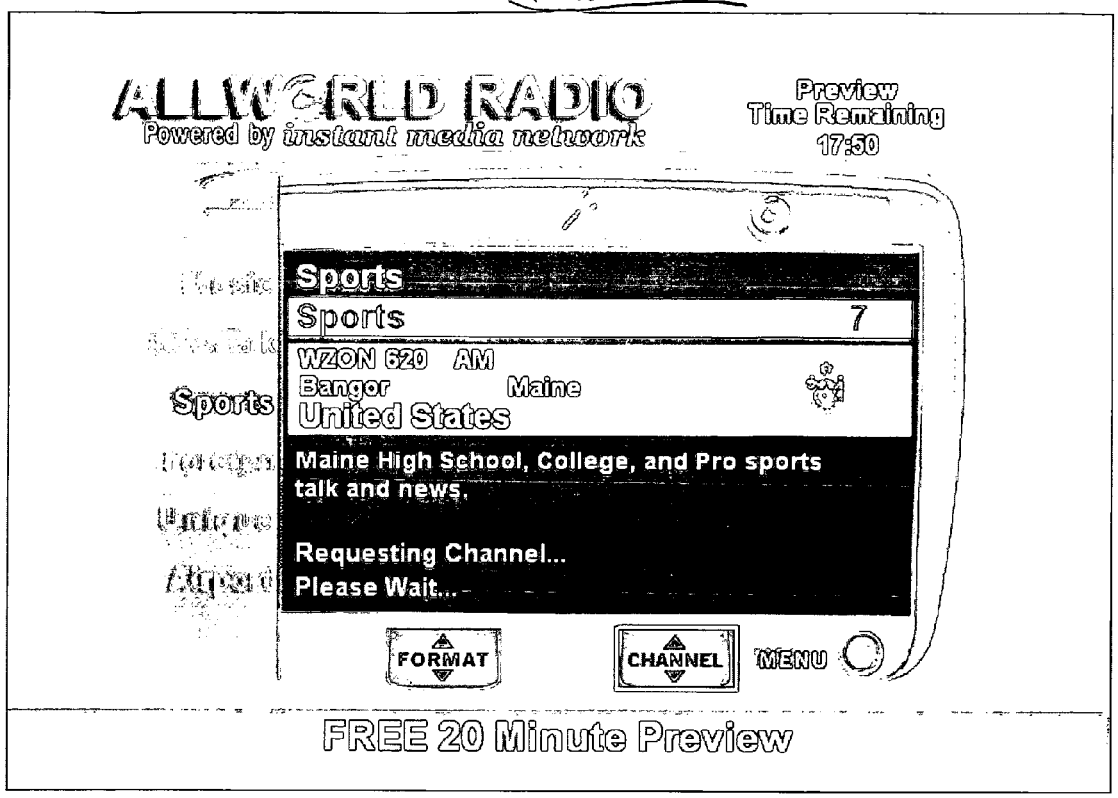
Figure 2F:
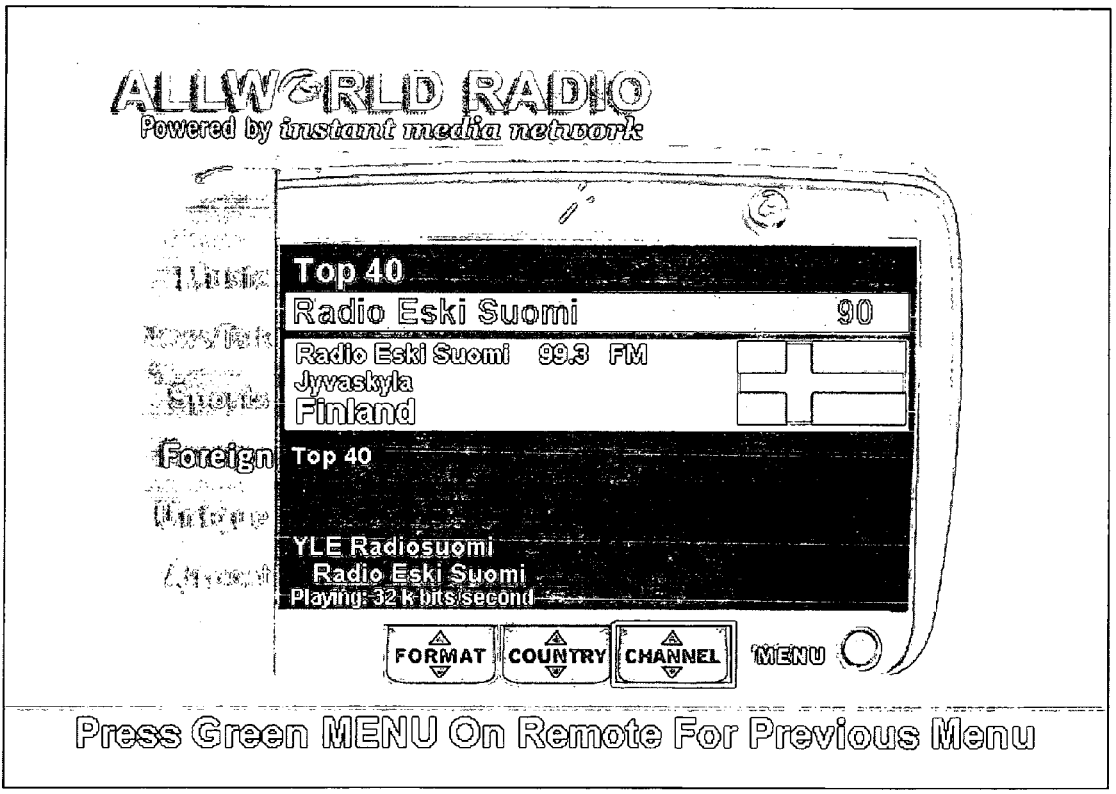
Figure 2G:
Figure 2H:
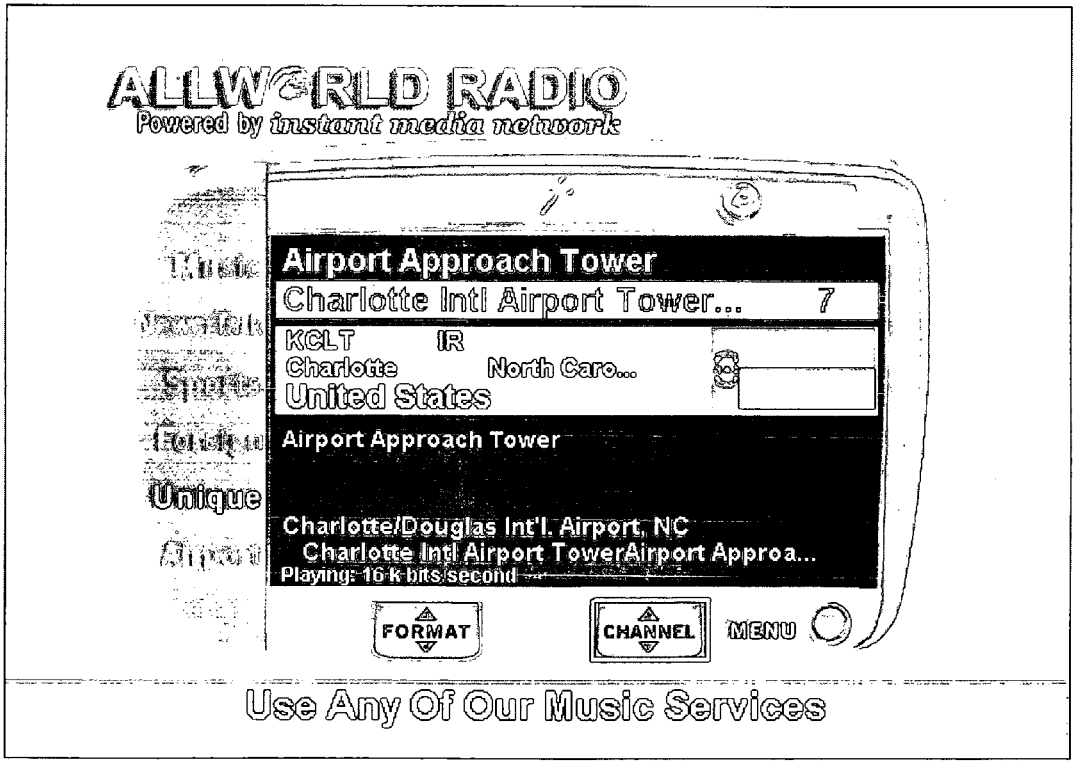
Figure 2I:
Figure 2J:
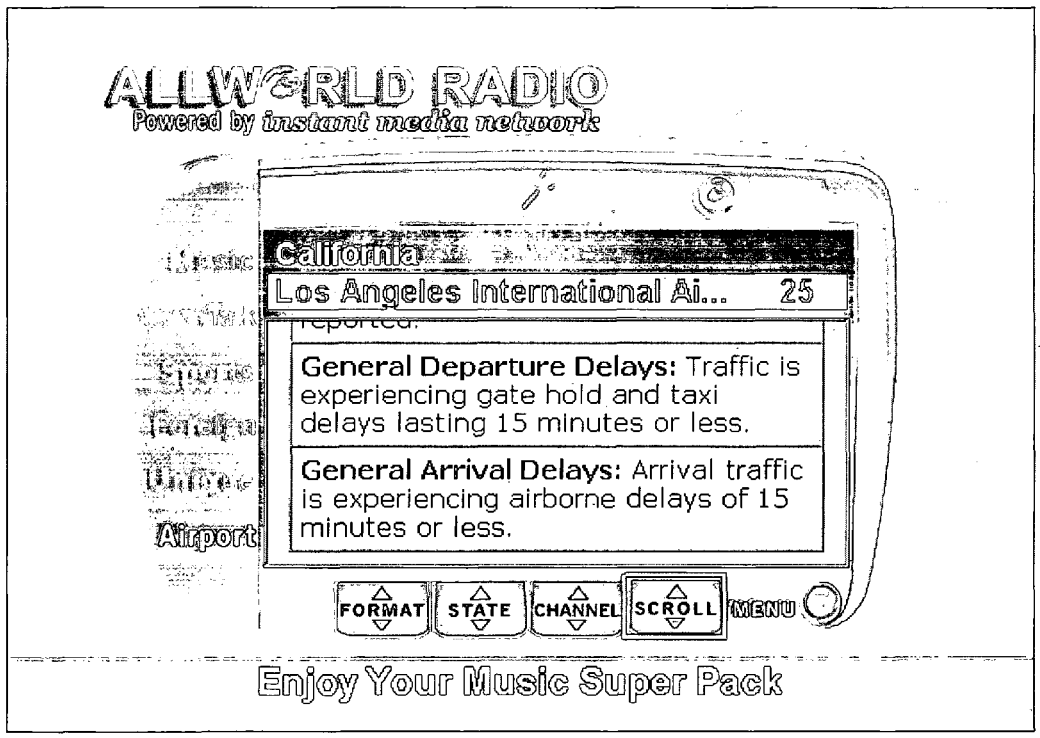

Referring now to the drawings and particularly to FIG. 1, there is shown a media content distribution system 10 configured in accordance with the invention. The system 10 includes a main server system 12 having an input side 14 and an output side 16. The input side 14 serves as a conduit for media content from any one of a number of content sources or providers 18, 20. The media content may comprise, for example, audio and/or video information, conveyed in either analog or digital form. A provider may be, for example, an Internet radio station that provides its content in a digital data streaming format (18), or an over-the-air radio station or system that broadcasts its content in an over-the-air analog format (20), e.g., AM, FM or in a satellite signal format. Content from the content providers 18, 20 is conveyed to the main server system 12, preferably over a data communications network 22 such as the Internet.

In the case of a provider that provides its content in a digital data streaming format (18), the streaming output of the provider is preferably conveyed to the main server system 12 over the data communications network 22. In the case of an analog, over-the-air content provider (20), the system 10 preferably includes an over-the-air content-to-streaming-content converter 24 that receives analog broadcast signals from provider 20. Such a converter 24 would typically include a digitizer that converts the analog signals into digital data, an encoder that outputs the digitized data in a compressed digital data format suitable for streaming, and a streaming server that transmits the digitized data over data communications network 22. The process of converting analog data into streaming data is well known in the art, and therefore the details of such a process are not provided herein. For such details, reference is made to, for example, Audio Streaming on the Internet, Experiences with Real-Time Streaming of Audio Streams, Jonas et al., IEEE Catalog Number: 97TH8280, pages SS71-SS76, the disclosure of which is incorporated by reference into this specification.

In the case of a satellite signal, converter 24 is preferably arranged to convert the data contained in the satellite signal to a format suitable for transmission over a data communications network. For example, the converter may convert the data to data packets suitable for transmission over the Internet.

Server system 12 receives streams of content 26, 28 from various content providers 18, 20 (via network 22), and multiplexes them together to form one or more composite data streams 30 to be conveyed to one or more receiver systems. One possible means for conveying composite data streams 30 is by upconverting them with an upconverter 31, and transmitting the upconverted streams to a satellite system 32 via an antenna 34 at the output side of server system 12. In one exemplary configuration, a composite data stream 30 is generated by time division multiplexing (TDM) a plurality of streaming signals using a coding scheme such as MPEG by an encoder of a conventional design. The composite TDM bit stream is upconverted to RF by a conventional quadrature phase-shift keyed (QPSK) modulator. The upconverted TDM bit stream 35 is then uplinked to the satellite system 32 through antenna 34. Detailed processes for forming a composite data stream for satellite transmission are well known in the art and therefore are not provided herein.

The satellite system 32 broadcasts upconverted composite bit stream 35 for reception by one or more receiver systems, such as a satellite radio receiver 42 (via an antenna 43) or an intermediary service provider 44 (via an antenna 45) having one or more associated end-user devices 46. A satellite radio receiver 42 may be part of a mobile system such as an automobile radio system, or a more stationary system such as an in-home radio system. Examples of intermediary service providers 44 includes cable TV operators, satellite TV operators and hospitality network operators. Corresponding end-user devices 46 may include the televisions and receiver boxes of cable TV subscribers, satellite TV subscribers and/or the in-room entertainment systems located in hotel rooms.

Alternatively, or in addition to satellite broadcasting, the streams of content 26, 28 may be formatted for distribution to the intermediary service providers 44 over a land based communications line 48, such as an RF coax cable or a digital data transmission line, e.g., T1, T2, etc. For an RF coax cable transmission, the streaming signals are converted to RF signals; for digital data transmission, e.g., Internet transmission, the signals remain in streaming format.

Server system 12 preferably includes a tuner database 50 that stores user interface data and content source data, which are made part of composite data streams 30 that are transmitted to satellite system 32 and/or intermediary service providers 44. Alternatively, some or all of the user interface data may be stored more locally, either at the intermediary service provider or in the end-user device.

User interface data includes graphical user interface (GUI) data that is used to create a "tuner skin" which is displayed on a user's receiver system 42, 46; the graphical information so displayed is referred to herein as a "tuner". With reference to the simplified examples shown in FIGS. 2a-2j, the tuner skin might include, for example, the border image of the tuner, the side selection menu, i.e., "Music," "News/Talk," "Sports," etc., and the bottom selection buttons, i.e., "FORMAT," "GENRE," and "CHANNEL." The content source data may include one or more of the following data for each of the content providers 18, 20: genre, provider location, graphics, text description, streaming bit rate, and URL, if applicable. Relevant content source data is used to display information on content providers 18, 20 that may be received using the tuner. As shown in FIGS. 2a-2j, such information is displayed in the main window of the tuner skin and may include a content provider's genre, call letters, location, streaming bit rate, etc.

Figure 3:
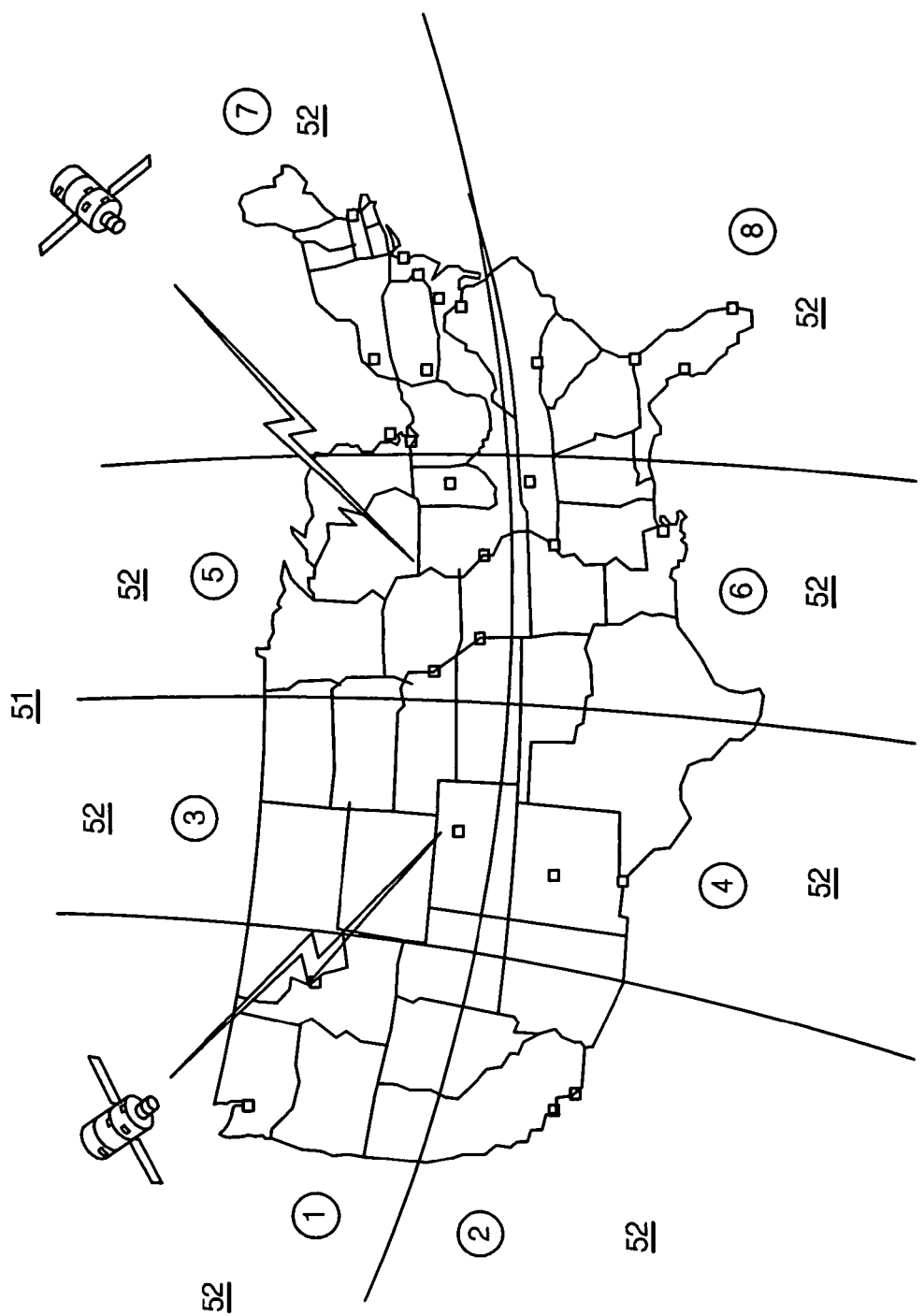
FIG. 3 depicts exemplary geographic regions that might be associated with a media content distribution system configured in accordance with the invention.

Due to programming subscription choices, licensing requirements and broadcast restrictions, the content available for listening through a particular receiver may be restricted. For example, a licensing agreement between the operator of system 10 and a content provider 18, 20 may limit reception of the provider's content to certain geographical areas. Accordingly, and with reference to FIG. 3, in one configuration of the system 10 the entire broadcast coverage area 51 of the system is divided into broadcast regions 52, each of which is assigned a unique geographic territory ID, e.g., 1, 2, 3, etc. These geographic territory ID are included in the content source data and are used during the creation of tuner database 36 such that the tuner displayed on a user's receiver system is limited to only those content providers that are licensed for that region.

As another example, a particular receiver system may have a programming package ID associated with it that restricts the number of content providers or the type of content available for listening. Similar programming package IDs are included in the content source data and are used during the tuner database creation process such that a user's receiver system displays only those content providers that are available in the receiver system's programming package.

Figure 4:
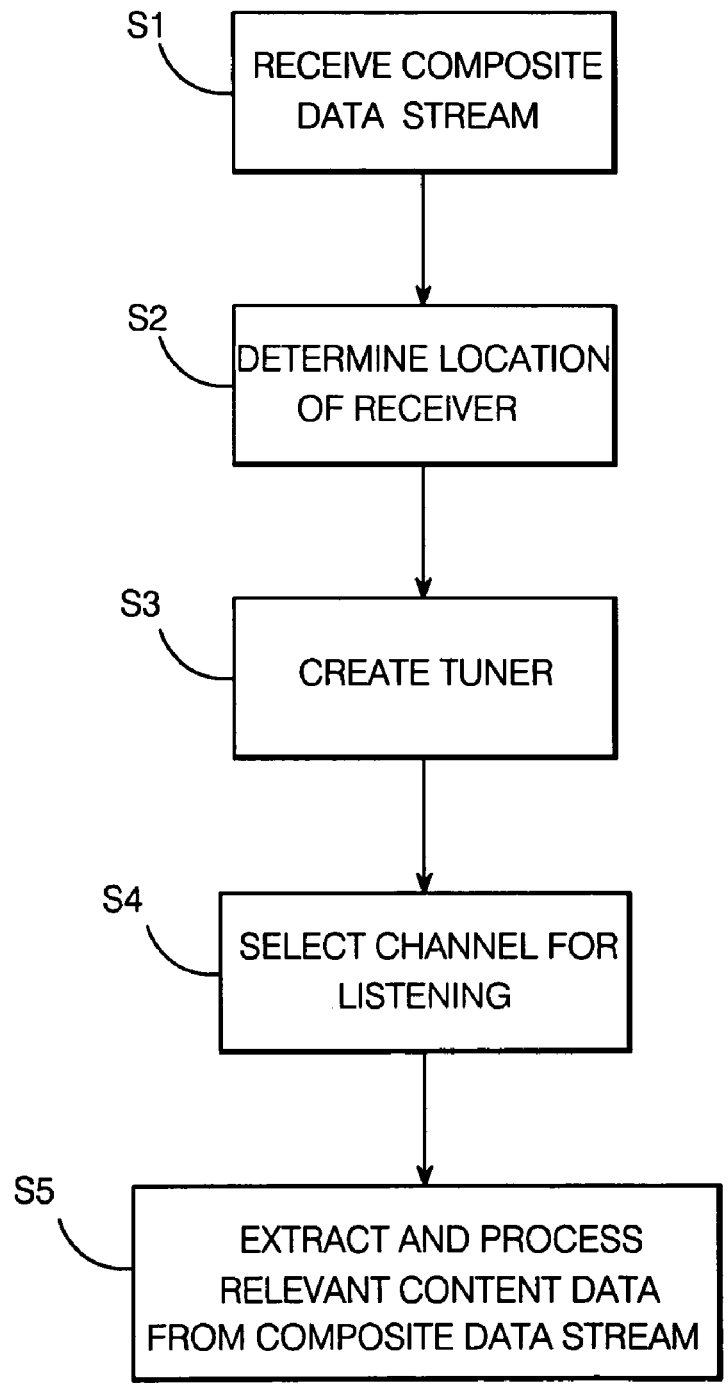
FIG. 4 is a flow chart illustrating one possible mode of operation for a media content distribution system configured in accordance with the invention.

One possible mode of operation is illustrated in FIG. 4. At step S1, a composite data stream including user interface data and content source data is received by a receiver system, which may be a satellite radio receiver 42 or an intermediary service provider 44. At step S2, the geographic location of the receiver system 42, 44 is determined from location data available from the receiver system. Such location data may be provided, for example, by a GPS receiver within the relevant receiver system 42, 44.

At step S3, once the location of the receiver system 42, 44 is determined, a tuner is created using the user interface data and the relevant content source data. Content source data is considered relevant if, for example it has a territory ID that corresponds to the determined location of the receiver system 42, 44 and/or a programming package ID that corresponds to the programming package of the receiver system. At step S4, a user may tune to a particular content provider through the created tuner. "Tune" as used herein means to select one of the streaming signals in the composite data stream 30 for listening through an end-user device.

At step S5, upon selection of a particular content provider, the receiver system 42, 44 extracts the content data associated with the selected content provider from the composite data stream 30 for further processing and output in an auditory form. Such further processing is well known in the art and in general terms includes digital-to-analog conversion of content data and amplification of analog content signals for output through speakers. In the case of the satellite radio receiver 42, this processing is done by the receiver. In the case of the intermediary service provider 44 receiver, this processing is done by the end-user device 46.

Figure 5:
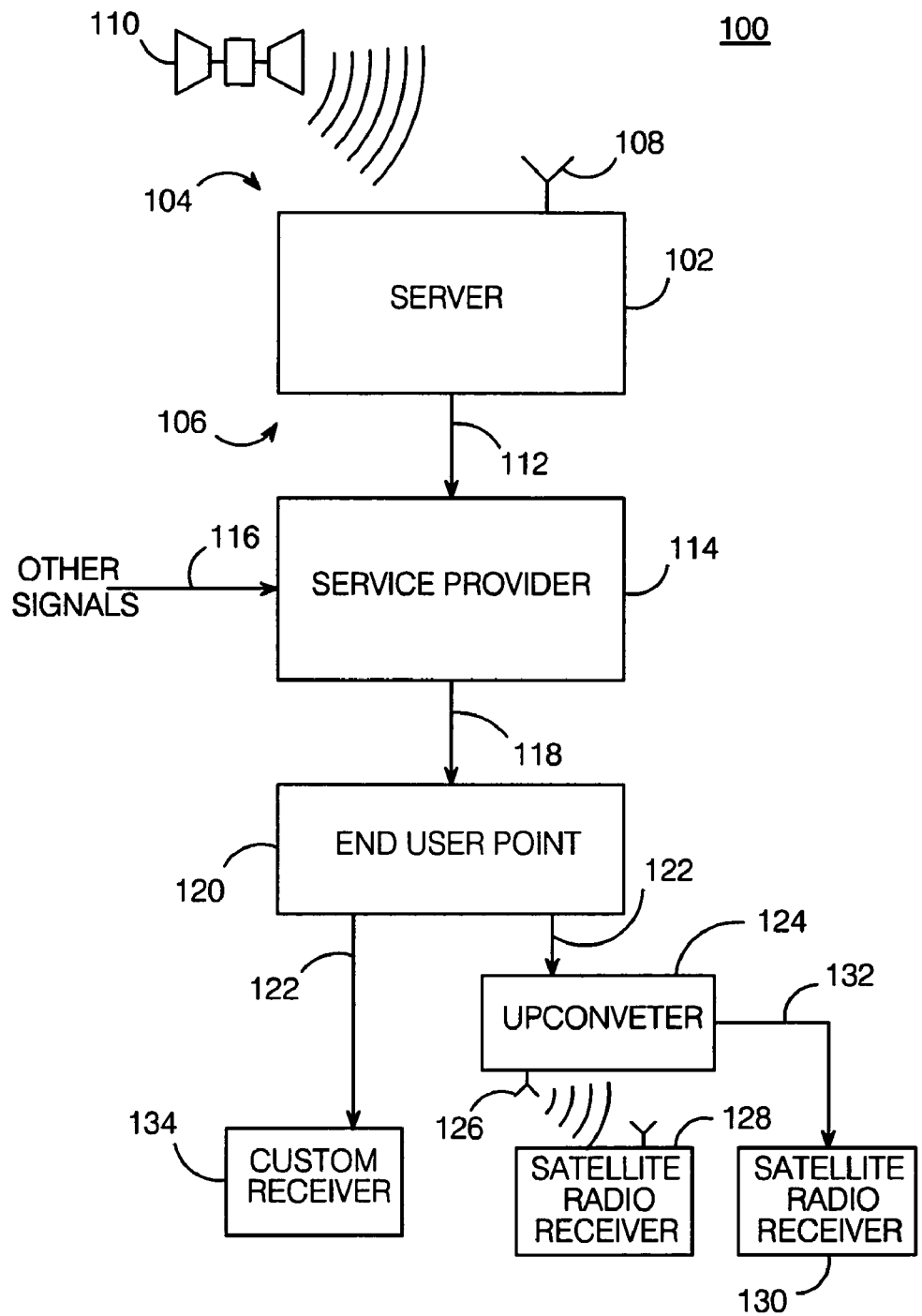
FIG. 5 is a block diagram which illustrates a possible extension of the media content distribution method of the present invention.

FIG. 5 illustrates an embodiment of the invention which extends the methods by which media content may be distributed by the present invention. System 100 includes a main server system 102 having an input side 104 and an output side 106. The input side 104 includes a satellite antenna 108 that receives content in the form of a composite satellite signal from a satellite 110; the composite satellite signal may be, for example, a satellite-transmitted upconverted composite bit stream 35 as was discussed above in relation to FIG. 1. Server 102 includes circuitry that downconverts the composite satellite signal into a downconverted composite signal, preferably in a format suitable for combining with other content signals. Methods of downconverting are well-known to those familiar with the satellite receivers; one possible downconverting circuitry embodiment is discussed below and shown in FIG. 6.

The downconverted composite signal 112 is transmitted to an intermediary service provider 114 that may receive other content signals 116, such as cable TV, Internet streams, etc. The intermediary service provider 114 includes circuitry that combines the downconverted signal 112 and the other content signals 116 into a single composite RF signal 118 that is made available to an end-user point 120 through a distribution system within the service provider 114. Circuitry related to the combining of signals is included in FIG. 6.

At the end user point 120, which may be a hotel guest room, for example, the composite RF signal 118 is input to a tuner through which a particular portion of the composite signal may be selected for further processing. If the portion of the composite signal corresponding to the downconverted satellite signal is selected, the selected signal 122 may be fed to an upconverter 124 that upconverts the previously downconverted signal to output the original satellite signal, or to output a signal suitable for reception by the receiver. A portion of the composite signal not corresponding to the downconverted satellite signal might also be selected and upconverted. The upconverted signal may be transmitted over the air by a low power transmitter 126 for reception by a standard satellite radio receiver 128, such as those associated with XM and Sirius Radio. Alternatively, the upconverted signal may be input to a standard satellite radio receiver 130 by a direct line connection 132. In another configuration, the selected signal 122 is input to a custom receiver 134 that is configured to receive and process the selected signal 122 in its downconverted form.

Figure 6A:
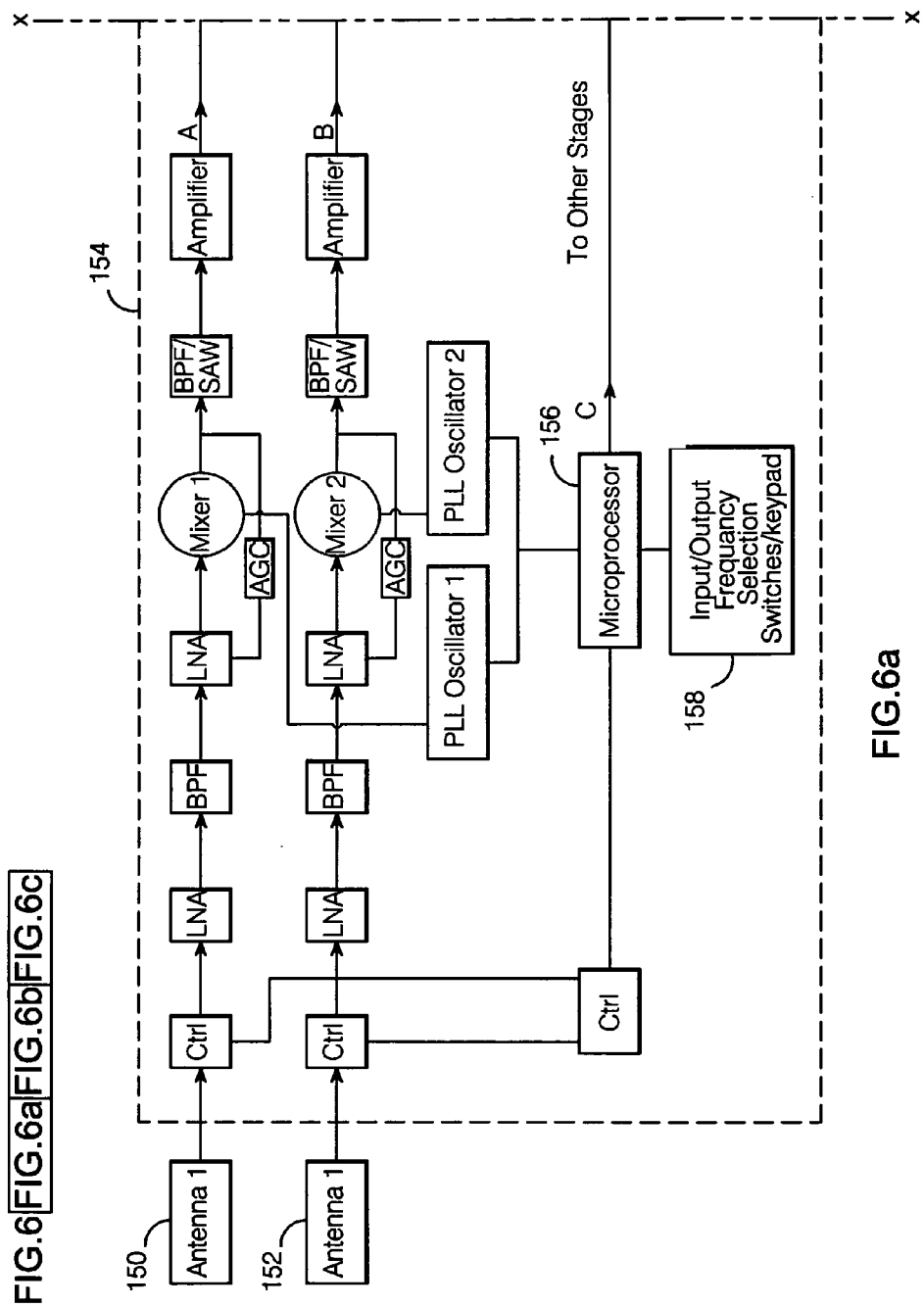
FIG. 6 is a block diagram of downconverting circuitry as might be used to downconvert composite satellite signals conveyed by a media content distribution system configured in accordance with the invention.
Figure 6B:
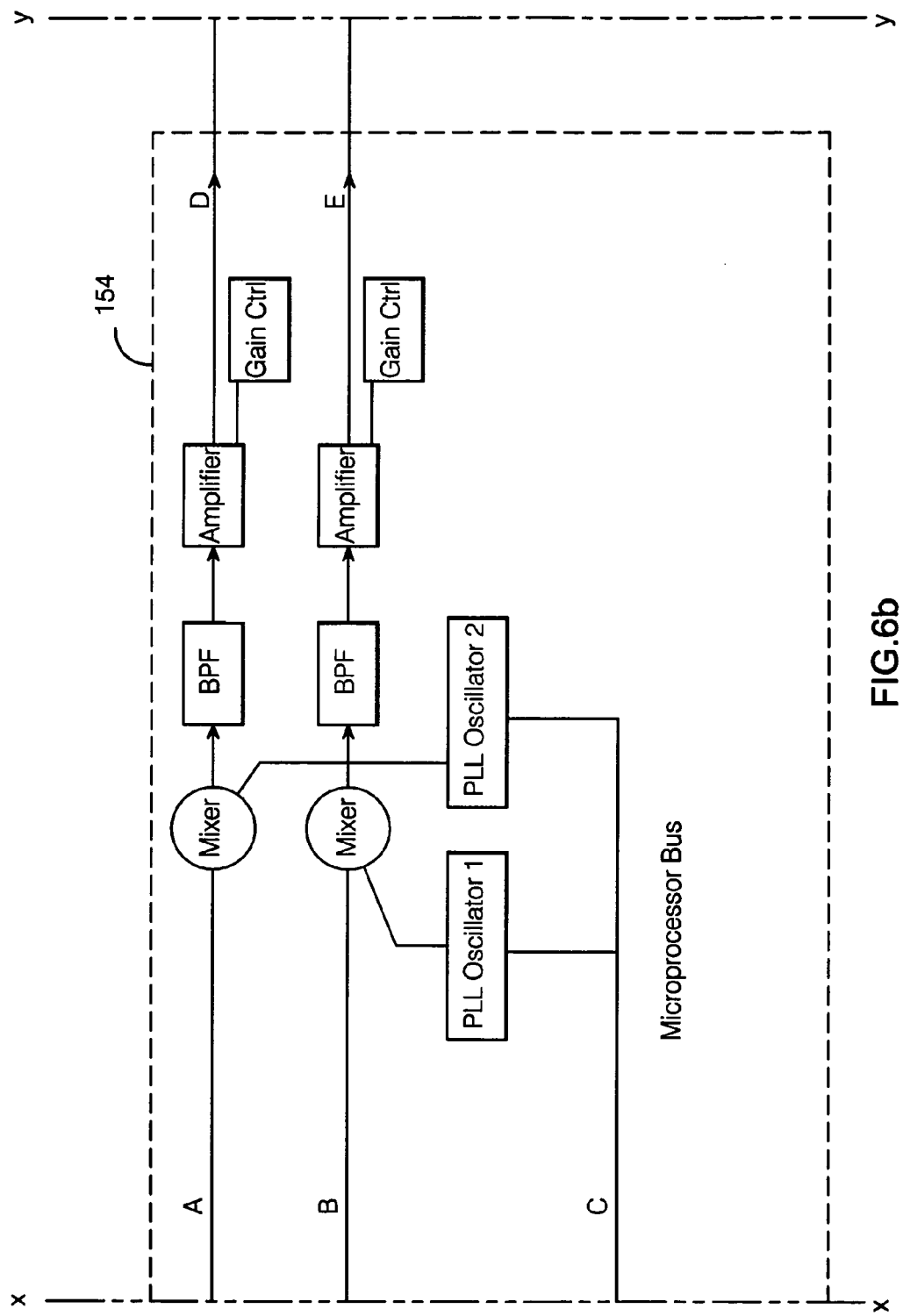
Figure 6C:
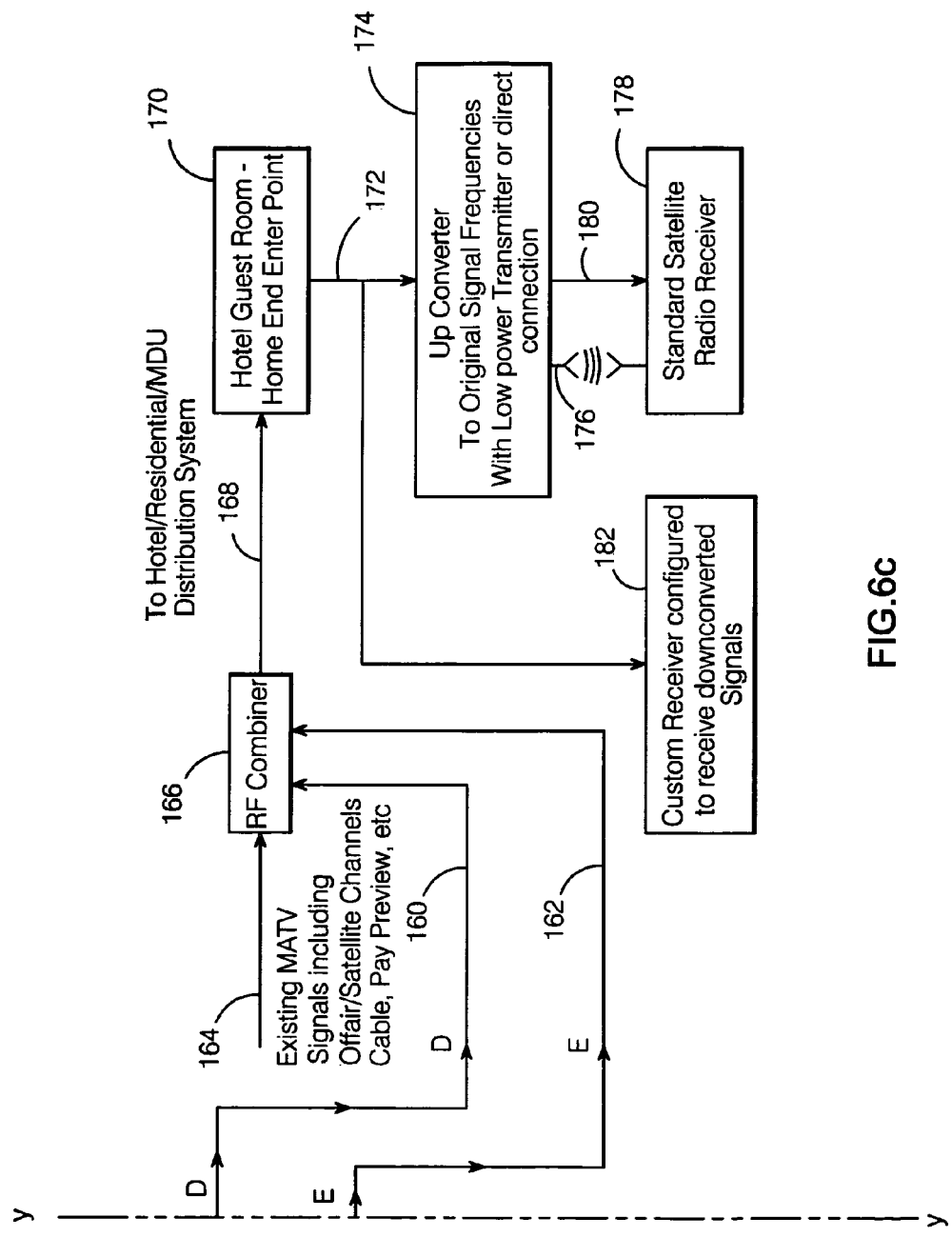

One possible embodiment of the downconverting and signal combining systems that might be used with the arrangement shown in FIG. 5 is illustrated in FIG. 6. Satellite signals from one or more content providers are received with respective antennas 150, 152; a dual antenna scheme is shown in this example. The received signals are processed with downconverting circuitry 154 under the control of a microprocessor 156 which may include a user interface 158, which would typically convert the incoming signals to RF frequencies. The downconverted signals 160, 162 may be combined with other content signals 164 that might be carried by, for example, an existing Master Antenna TV (MATV) system, such as cable or satellite channels, with an RF Combiner circuit 166. The composite signal 168 is provided to an end user point 170 such as a hotel guest room. The end user point typically includes a means of selecting one particular signal 172 from composite signal 168, which may be fed to an upconverter 174 that upconverts the previously downconverted signal to output the original satellite signal or a signal suitable for reception by a receiver. The upconverted signal may be transmitted over the air by a low power transmitter (176) for reception by a standard satellite radio receiver 178, such as those associated with XM and Sirius Radio. Alternatively, the upconverted signal may be input to standard satellite radio receiver 178 by a direct line connection (180). In another configuration, the selected signal 172 is provided to a custom receiver 182 that is configured to receive and process the selected signal in its downconverted form.

In one particular application of the systems described, the streaming content or the satellite signal content received and processed by the system is included in the media options provided as part of a hotel in-room entertainment system. Such hotel entertainment systems are described, for example, in U.S. Pat. Nos. 6,256,554, 6,438,450, 6,650,963 and 6,876,901, the disclosures of which are incorporated by reference. For example, the content from over-the-air radio stations that is processed by the system of FIG. 1 may be added to the selection menu shown in FIG. 3 of U.S. Pat. No. 6,876,901. In other applications, the system content received and processed by the system may be included in the media options provided as part of a cable TV system or satellite TV system.

In one possible configuration of the present system, the server system 12 includes a content modification function that extracts portions of a provider's content based on geographical constraints. For example, a content provider that is an over-the-air radio station located in Australia might have news and advertisements that are relevant only to its over-the-air coverage area as part of its content. The server system 12 is programmed to extract this content, so that it is not received by listeners outside of the over-the-air coverage area. Server system 12 might also extracts portions of a provider's content that is not licensed for distribution, such as ads or other content.

In another possible configuration, the server system 12 is programmed to store secondary content and to insert relevant secondary content in place of the extracted content. The secondary content has associated geographic constraints. A method is employed, such as the use of markers, to indicate when secondary content is about to begin, and the duration of secondary content's time slot. The server either inserts relevant secondary content into the content and transmits it as a composite signal, or simultaneously transmits the provider's content with dead period and one or more secondary content channels for one or more corresponding geographic regions. Alternatively, the server stops transmitting the duplicate provider content, and only transmits the secondary content channels.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A method of distributing content from multiple media content providers, said method comprising:
    providing an interface which receives media content from a plurality of media content providers;
    forming one or more composite data streams from the media content received from said plurality of content providers;
    providing a means of conveying said composite data streams to a plurality of receiver systems;
    providing a user interface for said receiver systems, said user interface displaying content provider information and allowing for the selection of one of the content providers for playing of the selected provider's media content;
    wherein a provider's content emanates from a source having an over-the-air coverage area and comprises primary content that is independent of the coverage area and secondary content that is specific to said coverage area, said method further comprising:
        extracting the secondary content from said provider's content for content being conveyed to receiver systems outside of said coverage area;
        storing alternate secondary content; and inserting alternate secondary content in place of the extracted secondary content for content being conveyed to receiver systems outside of said coverage area.

2. The method of claim 1, wherein the alternate secondary content is independent of any coverage area.

3. The method of claim 1, wherein the alternate secondary content is specific to a coverage area different than said over-the-air coverage area.

* * * * *